(12) United States Patent
Morioka

(10) Patent No.: US 11,005,138 B2
(45) Date of Patent: May 11, 2021

(54) BATTERY MODULE AND BATTERY PACK

(71) Applicant: Toyota Jidosha Kabushiki Kaisha, Toyota (JP)

(72) Inventor: Satoshi Morioka, Okazaki (JP)

(73) Assignee: Toyota Jidosha Kabushiki Kaisha, Toyota (JP)

( * ) Notice: Subject to any disclaimer, the term of this patent is extended or adjusted under 35 U.S.C. 154(b) by 20 days.

(21) Appl. No.: 15/890,562

(22) Filed: Feb. 7, 2018

(65) Prior Publication Data

US 2018/0233723 A1 Aug. 16, 2018

(30) Foreign Application Priority Data

Feb. 10, 2017 (JP) .............................. JP2017-022922

(51) Int. Cl.
*H01M 50/342* (2021.01)
*H01M 10/615* (2014.01)
(Continued)

(52) U.S. Cl.
CPC ..... *H01M 50/3425* (2021.01); *H01M 10/615* (2015.04); *H01M 10/625* (2015.04); *H01M 10/643* (2015.04); *H01M 10/6571* (2015.04); *H01M 50/20* (2021.01); *H01M 50/30* (2021.01); *H01M 50/342* (2021.01);
(Continued)

(58) Field of Classification Search
CPC ........... H01M 2/12–1294; H01M 50/147–148; H01M 50/166; H01M 50/171; H01M 50/183–198; H01M 50/30; H01M 50/35–367; H01M 10/42; H01M 10/425–4257; H01M 10/60–627;
(Continued)

(56) References Cited

U.S. PATENT DOCUMENTS 6,379,837 B1 * 4/2002 Takahashi ......... H01M 10/4257
429/151
9,440,601 B2 * 9/2016 Soleski ................. H01M 2/305
(Continued)

FOREIGN PATENT DOCUMENTS

JP 2012-015121 A 1/2012
JP 2014-132585 A 7/2014
(Continued)

*Primary Examiner* — Jonathan Crepeau
*Assistant Examiner* — Jacob Buchanan
(74) *Attorney, Agent, or Firm* — Dinsmore & Shohl LLP

(57) ABSTRACT

A battery module includes a plurality of single cells, a battery chamber, an exhaust chamber, a partition wall, a smoke exhaust cover and a seal member. The exhaust chamber is provided adjacently to the battery chamber. Gas released from the single cells flows through the exhaust chamber. The exhaust chamber has one or more exhaust holes configured to release the gas to an outside. The partition wall isolates the exhaust chamber and the battery chamber from each other. The smoke exhaust cover is arranged so as to lace the partition wall. The exhaust chamber is surrounded by the partition wall, the smoke exhaust cover and the seal member. The smoke exhaust cover has a protective protrusion at a location between the seal member and the exhaust valves adjacent to the seal member. The protective protrusion is configured upright from the smoke exhaust cover toward the partition wall.

14 Claims, 6 Drawing Sheets

(51) Int. Cl.
*H01M 10/6571* (2014.01)
*H01M 50/20* (2021.01)
*H01M 50/30* (2021.01)
*H01M 10/625* (2014.01)
*H01M 10/643* (2014.01)
*H01M 10/0525* (2010.01)

(52) U.S. Cl.
CPC .... *H01M 10/0525* (2013.01); *H01M 2220/20* (2013.01); *Y02E 60/10* (2013.01); *Y02T 10/70* (2013.01)

(58) Field of Classification Search
CPC ......... H01M 10/64–643; H01M 10/65; H01M 10/655–6561
See application file for complete search history.

(56) References Cited

U.S. PATENT DOCUMENTS

| | | | | |
|---|---|---|---|---|
| 2005/0079408 | A1* | 4/2005 | Hirano | H01M 2/1083 429/82 |
| 2006/0216583 | A1* | 9/2006 | Lee | H01M 10/615 429/120 |
| 2010/0116570 | A1* | 5/2010 | Sugawara | B60K 1/04 180/65.1 |
| 2011/0135975 | A1* | 6/2011 | Fuhr | H01M 2/08 429/53 |
| 2012/0148889 | A1* | 6/2012 | Fuhr | H01M 2/1077 429/87 |
| 2015/0072195 | A1* | 3/2015 | Soleski | B60L 50/51 429/90 |
| 2016/0141573 | A1* | 5/2016 | Aoki | H01M 2/1016 429/53 |

FOREIGN PATENT DOCUMENTS

| | | |
|---|---|---|
| JP | 2016-134232 A | 7/2016 |
| JP | 2016-139510 A | 8/2016 |
| WO | WO-2014156001 A1 * | 10/2014 .......... H01M 2/1016 |

* cited by examiner

BATTERY MODULE AND BATTERY PACK

CROSS-REFERENCE TO RELATED APPLICATIONS

This application claims priority to Japanese Patent Application No. 2017-022922 filed on Feb. 10, 2017, which is incorporated herein by reference in its entirety including the specification, drawings and abstract.

BACKGROUND

1. Technical Field

The disclosure relates to a battery module and a battery pack that includes one or more battery modules each including a plurality of single cells.

2. Description of Related Art

Conventionally, there has been suggested that a plurality of single cells are assembled to form a battery module and, in addition, one or more battery modules are assembled to form a battery pack. The thus configured battery pack is widely used as a power supply for an electric vehicle, a hybrid vehicle or a power-assisted bicycle, or a power supply for an electrical apparatus.

Incidentally, there is known that each single cell that is used in such a battery pack generates gas when an abnormal reaction occurs and, as a result, the internal pressure of the single cell increases. For this reason, each single cell has an exhaust valve that releases gas to the outside when the internal pressure of the single cell becomes higher than or equal to a prescribed value because of generation of the gas. A battery module generally includes an exhaust chamber through which the gas flows.

For example, Japanese Patent Application Publication No. 2014-132585 (JP 2014-132585 A) describes a secondary battery device (battery module) that has an exhaust passage (exhaust chamber) through which gas flows. In this secondary battery device, within the upper face of an upper case that covers one end of each single cell, a pair of partition walls are formed upright on both sides of exhaust holes (exhaust valves), and a closing plate is fixed on the pair of partition walls. Thus, the exhaust passage through which gas flows is defined. The partition walls and the closing plate are made of a synthetic resin, or the like.

SUMMARY

In JP 2014-132585 A, in order to prevent a leakage of gas, the partition walls and the closing plate need to be sealed in an airtight manner. In other words, in JP 2014-132585 A, a close contact portion between each partition wall and the closing plate functions as a seal portion that prevents a leakage of gas.

In the configuration described in JP 2014-132585 A, there is no obstacle that blocks a flow of gas between each exhaust valve and each seal portion (the contact portion between each partition wall and the closing plate), so gas released from each exhaust hole easily reaches the seal portions. Ordinarily, gas released from each exhaust valve has an extremely high pressure and high temperature. As such gas reaches the seal portions, the seal portions degrade because of heat or pressure, with the result that the seal performance of the seal portions deteriorates. As a result in the ease of the configuration in which there is no obstacle between each exhaust valve and each seal portion as in the case described in JP 2014-132585 A, when once gas is released from each exhaust valve, the airtightness of the exhaust passage (exhaust chamber) significantly deteriorates, with the result that there is a concern about a leakage of gas.

The disclosure provides a battery module and a battery pack that are able to further effectively maintain the airtightness of an exhaust chamber through which gas flows.

A first aspect of the disclosure provides a battery pack. The battery pack includes one or more battery modules. Each battery module includes a plurality of single cells, a battery chamber, an exhaust chamber, a partition wall, a smoke exhaust cover and a seal member. Each of the single cells includes an exhaust valve configured to release gas. The battery chamber accommodates the plurality of single cells. The exhaust chamber is provided adjacently to the battery chamber. The exhaust chamber has one or more exhaust holes configured to flow through gas released from the single cells and configured to release the gas to an outside. The partition wall isolates the exhaust chamber and the battery chamber from each other in a state where the exhaust valves of the plurality of single cells are exposed to the exhaust chamber. The smoke exhaust cover is arranged so as to face the partition wall. The seal member is interposed between a peripheral edge of the smoke exhaust cover and a peripheral edge of the partition wall. The seal member seals the smoke exhaust cover and the partition wall in an airtight manner. The exhaust chamber is surrounded by the partition wall, the smoke exhaust cover and the seal member. The smoke exhaust cover includes a protrusion that is configured upright from the smoke exhaust cover toward the partition wall at least at a location between the seal member and the exhaust valves adjacent to the seal member without intervening the exhaust hole in order to block gas, released from the exhaust valves of the plurality of single cells, from reaching the seal member.

With the above configuration, gas that reaches the seal member is significantly reduced, so degradation of the seal member due to gas is inhibited. As a result, the airtightness of the exhaust chamber through which gas flows is further effectively maintained.

The exhaust hole may be provided near each of both ends of the exhaust chamber in a first direction, and the smoke exhaust cover may include a protrusion at least at a location between a seal member located at each end in a second direction perpendicular to the first direction and the exhaust valves located at each end in the second direction, the protrusion may be configured upright from the smoke exhaust cover toward the partition wall and may extend in the first direction.

When the protrusion is configured so as so extend in the first direction, a flow of gas toward the seal member is blocked, but a flow of gas toward the exhaust hole is not blocked, so gas is smoothly emitted.

In this case, the smoke exhaust cover may further include a protrusion at a location between two exhaust valves adjacent in the second direction, and the protrusion may be configured upright from the smoke, exhaust coyer toward the partition wall and may extend in the first direction.

By providing the protrusion not only at the location between the seal member and the exhaust valves but also at the location between adjacent two of the exhaust valves, gas that reaches the seal member is further reliably reduced, so degradation of the seal member due to gas is further effectively inhibited.

The protrusion may contact with the partition wall.

By bringing the protrusion into contact with the partition wall, passage of gas is further reliably prevented, so degradation of the seal member due to gas is further effectively inhibited.

A back side of the protrusion may be a recess, and the battery module may further include a heater accommodated in the recess and configured to heat the single cells.

By arranging the heater in the recess, the distance between each single cell and the heater is reduced, so the single cells are farther efficiently heated. Since space for installing the heater is not additionally required, the build of each battery module is reduced.

In this ease, the battery pack may further include a heat-conductive frame including a heat conductive metal, the battery module being mounted on the heat-conductive frame. The heater may include a heating element and a heat-conducting element that covers the heating element, and the heat-conducting element may contact with the smoke-exhaust cover and the heat-conductive frame.

With the above configuration, heat at the time of emission of gas is easy to be transmitted to the heat-conductive frame via the smoke exhaust cover and the heat-conducting element. As a result, heat at the time of emission of gas is rapidly diffused.

A second aspect of the disclosure provides a battery module. The battery module includes a plurality of single cells, a battery chamber, an exhaust chamber, a partition wall, a smoke exhaust cover and a seal member. Each of the single cells includes an exhaust valve configured to release gas. The battery chamber accommodates the plurality of single cells. The exhaust chamber is provided adjacently to the battery chamber. The exhaust chamber has one or mote exhaust holes configured to flow through gas released from the single cells and configured to release the gas to an outside. The partition wall isolates the exhaust chamber and the battery chamber from each other in a state where the exhaust valves of the plurality of single cells are exposed to the exhaust chamber. The smoke exhaust cover is arranged so as to face the partition wall. The seal member is interposed between a peripheral edge of the smoke exhaust cover and a peripheral edge of the partition wall. The seal member seals the smoke exhaust cover and the partition wall in an airtight manner. The exhaust chamber is surrounded by the partition wall, the smoke exhaust cover and the seal member. The smoke exhaust cover includes a protrusion that is configured upright from the smoke exhaust cover toward the partition wall at least at a location between the seal member and the exhaust valves adjacent to the seal member without interring the exhaust hole in order to block gas, released from the exhaust valves of the plurality of single cells, from reaching the seal member.

With the battery pack according to the first aspect of the disclosure or the battery module according to the second aspect of the disclosure, gas that reaches the seal member is significantly reduced, so degradation of the seal member due to gas is inhibited. As a result, the airtightness of the exhaust chamber through which gas flows is further effectively maintained.

BRIEF DESCRIPTION OF THE DRAWINGS

Features, advantages, and technical and industrial significance of exemplary embodiments of the disclosure will be described below with reference to the accompanying drawings, in which like numerals denote like elements, and wherein.

DETAILED DESCRIPTION OF EMBODIMENTS

Figure 1:
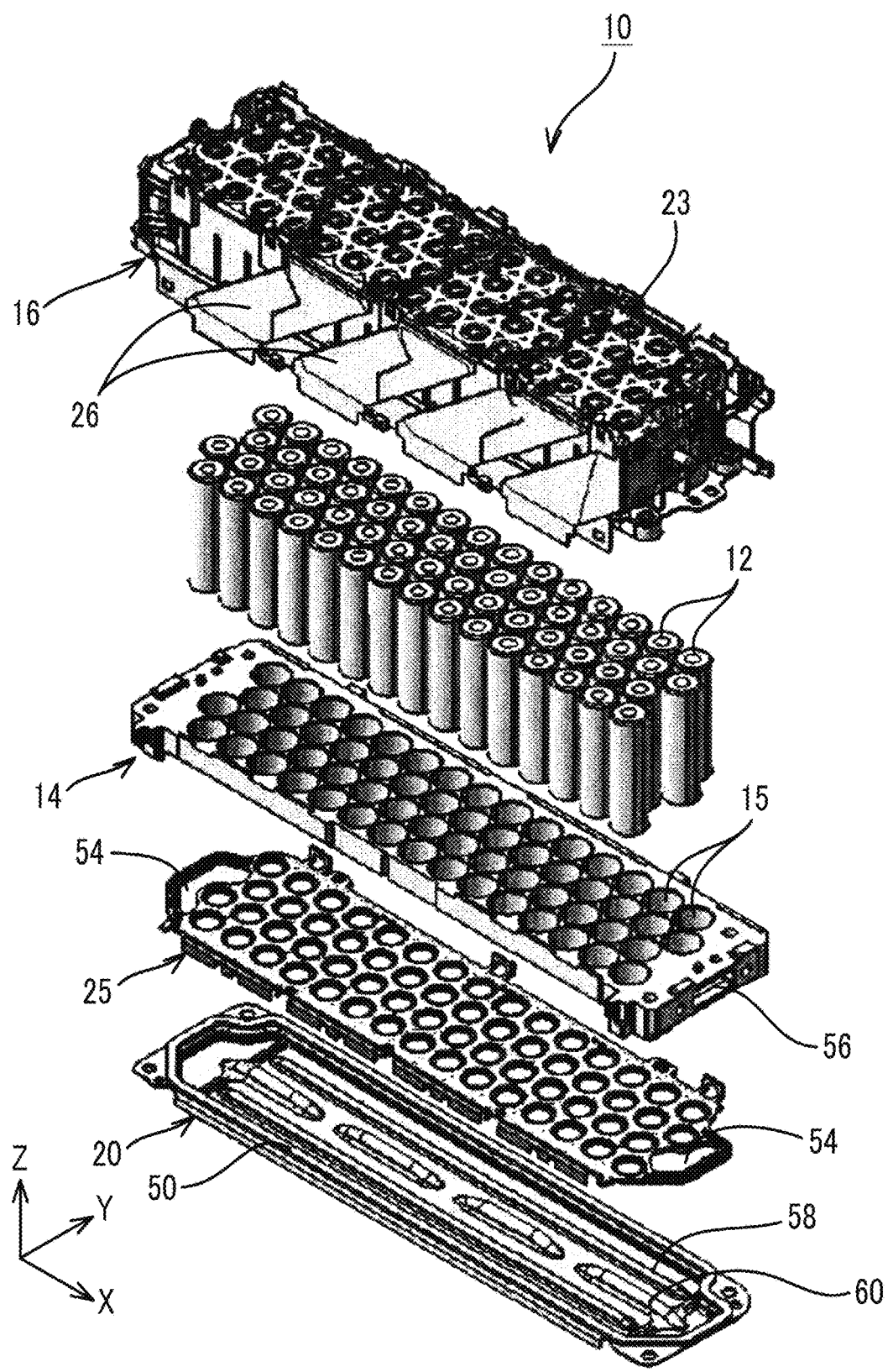
FIG. 1 is an exploded perspective view of a battery module.
Figure 2:
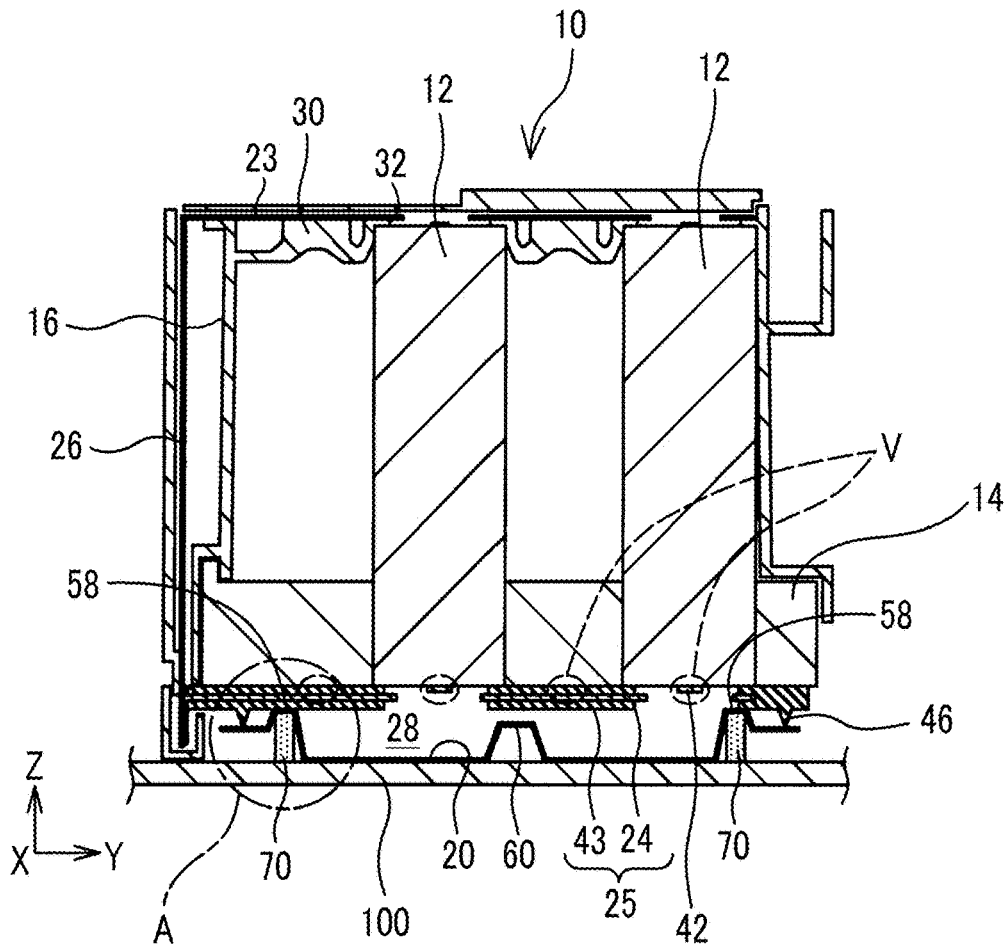
FIG. 2 is a cross-sectional view of the battery module, taken along a YZ plane.
Figure 3:
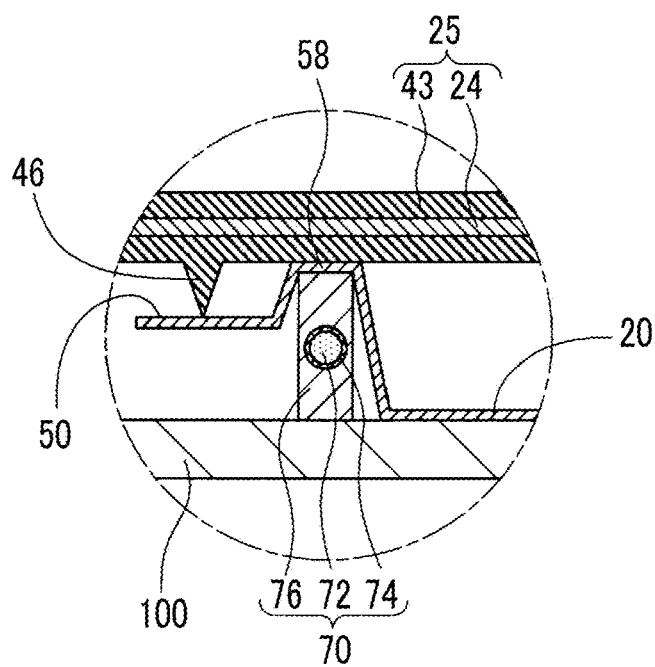
FIG. 3 is an enlarged view of portion A in FIG. 2.

Hereinafter, the configuration of a battery pack will be described with reference to the accompanying drawings. FIG. 1 is an exploded perspective view of each battery module 10 that is incorporated in the battery pack; FIG. 2 is a cross-sectional view of the battery module 10, taken along a YZ plane. FIG. 3 is an enlarged vie w of portion A in FIG. 2. In the following description, the longitudinal direction of the battery module 10 is referred to as X direction, the axial direction of each single cell 12 is referred to as Z direction, and a direction perpendicular to the X direction and the Z direction is referred to as Y direction.

The battery pack is used as a power supply for an electric vehicle, a hybrid vehicle or a power-assisted bicycle, or a power supply for an electrical apparatus. The battery pack is formed such that one or more battery modules 10 are mounted in a pack case. The pack case is formed by assembling heat-conductive frames 100 made of a material having an excellent electrical conductivity, such as aluminum. Each battery module 10 is fixedly mounted on the heat-conductive frame 100. The number of the battery modules 10 that are accommodated in the pack case is not limited, and may be one or two or more. An array of the battery modules 10 inside the pack case is also not limited. Therefore, for example, the plurality of battery modules 10 may be arranged in a two-dimensional array inside the pack case. The inside of the pack case may be partitioned into multiple layers, and the plurality of battery modules 10 may be arranged one above the other inside the pack case. In addition to the one or more battery modules 10, a junction box that relays power lines, a microcomputer that processes electrical signals output from various sensors (for example, a voltage sensor, a temperature sensor, and the like), or the like, may be further provided inside the pack case.

Next, the configuration of each battery module 10 will be described. The battery module 10 includes a plurality of circular columnar single cells 12. Each of the single cells 12 is a chargeable and dischargeable secondary battery, and is, for example, a nickel-metal hydride battery, a lithium ion battery, or the like, accommodated in a circular columnar case. A negative electrode and a positive electrode that are the electrodes of each single cell 12 are provided at both ends of the single cell 12 in the axial direction. In the illustrated example, each single cell 12 is held in position in which the negative electrode is disposed at the lower side. Of course, the positions of the negative electrode and positive electrode may be inverted, and the negative electrode may be disposed at the upper side and the positive electrode may be disposed at the lower side.

Figure 4:
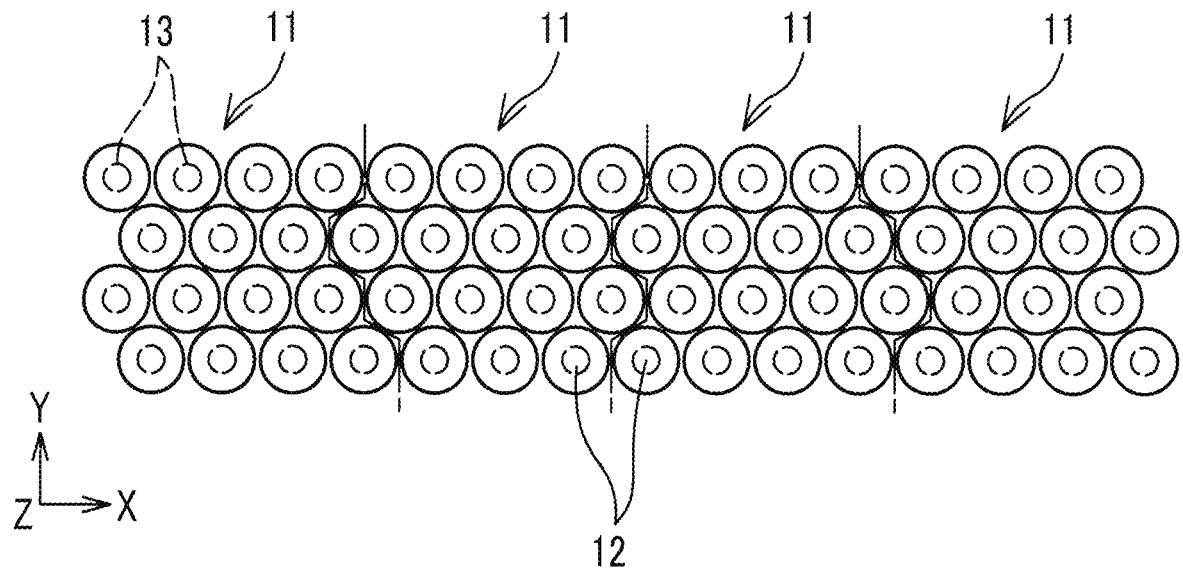
FIG. 4 is a view that shows an array of single cells.

The battery module 10 shown in FIG. 3 includes the sixty single cells 12. The sixty single cells 12 are arranged in an array of 4 rows and 15 columns. FIG. 4 is a view that shows an array of the sixty single cells 12. The sixty single cells 12 arranged in an array of 4 rows and 15 columns are separated at three portions and divided into four battery groups 11 in the longitudinal direction (column direction, X direction). The alternate long and two-short dashes lines in FIG. 4 indicate boundary lines between the battery groups 11. Each battery group 11 consists of the fifteen single cells 12. The fifteen single cells 12 that belong to the same battery group 11 are connected by a positive electrode bus bar 23 and a negative electrode bus bar 25 (described later) in parallel with one another. Each battery group 11 in which the fifteen single cells 12 are connected in parallel with one another is serially connected to another one of the battery groups 11 or an external output terminal by inter-group bus bars 26 (described later).

The negative electrode-side end face, that is, the lower end face, of each single cell 12 has an exhaust valve 13 that allows a release of gas generated inside the single cell 12. The broken-line ellipses V in FIG. 2 indicate the positions of the exhaust valves 13 in the Y direction. The configuration of each exhaust valve 13 is not specifically limited as long as the exhaust valve 13 is able to release the internal pressure of the single cell 12 when the internal pressure has increased. Each exhaust valve 13 may be, for example, formed by locally reducing the thickness of the exterior case of the single cell 12. As gas is produced inside each single cell 12 due to overcharging, overdischarging, short circuit, or the like, and the internal pressure of the single cell 12 increases, the exhaust valve 13 (thin portion) breaks, and the gas is released to the outside of the single cell 12. Since the released gas has m extremely high pressure, the temperature of the released gas is extremely high, and the temperature can reach several hundreds of degrees.

As shown in FIG. 1 and FIG. 2, each single cell 12 is held upright in a state where the positions of the positive electrode and negative electrode are aligned. The plurality of single cells 12 are accommodated in a battery chamber surrounded by the negative electrode bus bar 25 and a protection case 16 in a state where the plurality of single cells 12 are held by a battery holder 14. The battery holder 14 has a substantially plate shape. Accommodation holes 15 are arranged in the plane of the plate in a two-dimensional manner. The accommodation holes 15 axe arranged in an array of 4 rows and 35 columns, and the accommodation holes 15 in any adjacent rows are arranged so as to be shifted by a half pitch.

Each accommodation hole 15 has a round hole shape that complements the circular columnar shape of each single cell 12, and is a through-hole into which the lower end of each single cell 12 is inserted. Each single cell 12 is inserted in the accommodation hole 15, and is fixed with adhesive agent. The length of each accommodation hole 15 in the Z direction is such a sufficient length that the held single cell 12 does not wobble. Each accommodation hole 35 extends through the battery holder 14 in the thickness direction, and the lower end of a corresponding one of the single cells 12, by extension, the negative electrode and the exhaust valve 13, are exposed downward. The battery holder 14 is made of a high thermally conductive material, such as aluminum, in order to reduce variations in temperature among the single cells 12 by equally distributing generated heat.

The plurality of single cells 12 held by the battery holder 14 are covered with the protection case 16. The protection case 16 is made of a resin having an electrical insulating property, and has a substantially box shape such that the bottom of the protection case 16 is completely open. The lower end of the protection case 16 is fixed to the peripheral edge of the battery holder 14. As will be described later, the positive electrode bus bar 23 is integrated, with the protection ease 16.

The protection case 16 has a ceiling board 30 (see FIG. 2). The ceiling board 30 is provided near the upper end of the protection case 16, and presses the positive electrode-side end faces of the single cells 12 toward the negative electrode side. The ceiling board 30 has holding openings 32 having a smaller diameter than the outside diameter of each of the arranged single cells 12. The positive electrode, of each single cell 12 is exposed to the outside via a corresponding one of the holding openings 32, while the end face of each single cell 12 is pressed toward the negative electrode side by the peripheral edge of the holding opening 32. The positive electrode bus bar 23 is fixedly connected to the upper face of the ceiling board 30.

Figure 5:
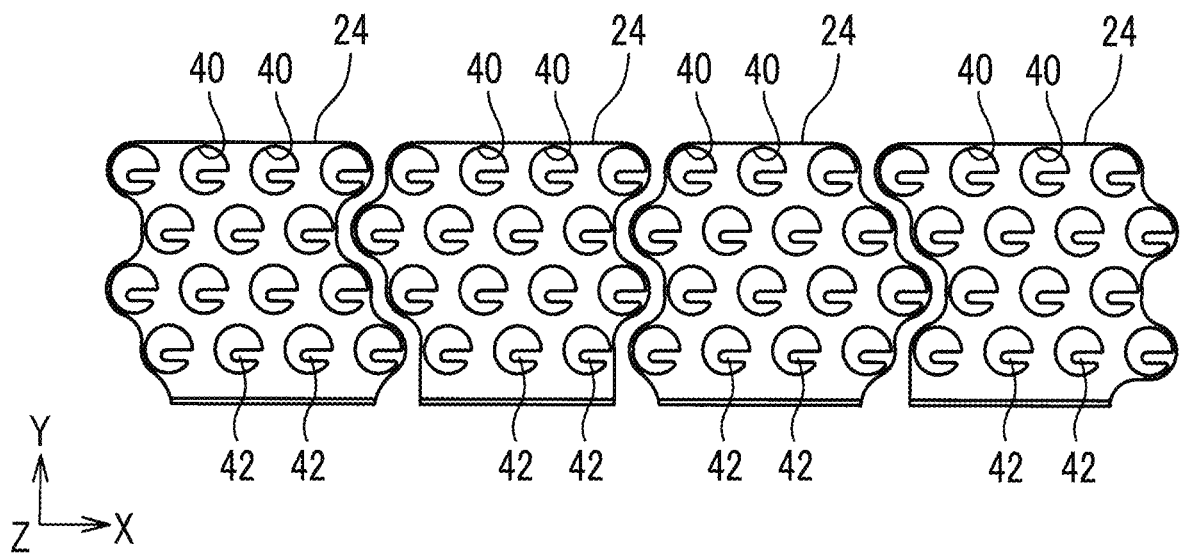
FIG. 5 is a view that shows conductive plates of a negative electrode bus bar.

The negative electrode bus bar 25 and the positive electrode bus bar 23 are arranged on both sides of the single cells 12 in the axial direction. The negative electrode bus bar 25 electrically connects the negative electrodes of the single cells 12 with each other. The positive electrode bus bar 23 electrically connects the positive electrodes of the single cells 12 with each other. FIG. 5 is a plan view of conductive plates 24 of the negative electrode bus bar 25.

The negative electrode bus bar 25 is formed by integrating the conductive plates 24 in the same number (four in the illustrated example) as the battery groups 11 with the use of a resin material 43. The four conductive plates 24 are integrated with the resin 43 (see FIG. 2) in a state where the four conductive plates 24 are positioned at a sufficient spacing from each other as an insulating distance. The negative electrode bus bar 23 is held in such a manner that the peripheral edge of the negative electrode bus bar 25 is sandwiched between a smoke exhaust cover 20 and the battery holder 14.

Each conductive plate 24 electrically connects the negative electrodes of the fifteen single cells 12 that constitute one of the battery groups 11. Each conductive plate 24 is a flat plate member made of a conductive material, such as copper. Each conductive plate 24 has penetrating openings. 40 corresponding to the arranged single cells 12. The penetrating opening 40 is provided one by one for each of the single cells 12, and the lower end face of a corresponding one of the single cells 12, by extension, the exhaust valve 13, is exposed to the exhaust chamber 28. For this reason, in the present embodiment, the negative electrode bus bar 25 functions as a partition wall that isolates the exhaust chamber 28 and the battery chamber from each other in a state where the exhaust valves 13 of the plurality of single cells 12 are exposed to the exhaust chamber 28. Gas released from the exhaust valve 13 of each single cell 12 passes through the penetrating opening 40 and reaches the exhaust chamber 28.

Each penetrating opening 40 is slightly smaller in diameter than the outside diameter of each single cell 12. The negative electrode-side end face of each single cell 12 is supported by the peripheral edge of the penetrating opening 40 (more accurately, the resin 43 that covers the peripheral edge). In other words, each single cell 12 is sandwiched by the ceiling board 30 of the protection case 16 and the negative electrode bus bar 25 in the axial direction.

A connecting piece 42 that is part of the conductive plate 24 is located inside a corresponding one of the penetrating openings 40. The connecting piece 42 is formed in a leaf spring shape and has an adequate elasticity. As a portion of the connecting piece 42 approaches the distal end, the connecting piece 42 is inclined so as to approach the negative electrode of the single cell 12. The distal ends of all the connecting pieces 42 are in contact with the negative electrodes of the corresponding single cells 12, and electrically connect the negative electrodes of the fifteen single cells 12 with one another.

As described above, the four conductive plates 24 are integrated by the resin 43, and constitute the negative electrode bus bar 25. The negative electrode bus bar 25 has exhaust holes 54 near both ends thereof in the X direction. The exhaust holes 54 are holes that guide gas flowing through the exhaust chamber 28 (described later) to the outside, and are holes that communicate, exhaust passages 56, provided in the battery holder 14, with the exhaust chamber 28.

A seal lip 46 is provided, at the peripheral edge of the negative electrode bus bar 25. The seal lip 46 protrudes toward the smoke exhaust cover 20. The seal lip 46 is integrally molded with the resin 43 of the negative electrode bus bar 25. The cross-sectional shape of the seal lip 46 is substantially a triangular shape that tapers toward the distal end. The seal lip 46 closely contacts with a seal face 50 of the smoke exhaust cover 20 (described later). Thus, the exhaust chamber 28 is sealed in an airtight manner. The seal lip 46 has an endless shape that surrounds all around the negative electrode bus bar 25. The exhaust holes 54 are provided on the inner side with respect to the seal lip 46.

The positive electrode bus bar 23 is arranged above the single cells 12. The positive electrode bus bar 23 includes conductive plates each having a similar shape to that of each conductive plate 24. The negative electrode bus bar 25 itself is one component; however, the positive electrode bus bar 23 is incorporated in the protection case 16 and integrated with the protection case 16, Each of the conductive plates of the positive electrode bus bar 23 also electrically connects the positive electrodes of the fifteen single cells 12 that constitute one of the battery groups 11. With the negative electrode bus bar 25 and the positive electrode bus bar 23, the fifteen single cells 12 that constitute one of the battery groups 11 are connected in parallel with one another.

The four battery groups 11 are serially Connected by the inter-group bus bars 26. Specifically, each inter-group bus bar 26 electrically connects the corresponding conductive plate 24 of the negative electrode bus bar 25, connected to one of the battery groups 11, with the corresponding conductive plate of the positive electrode bus bar 23, connected to another one of the adjacent battery group 11, or the external output terminal. Each inter-group bus bar 26 is substantially a flat plate member made of a conductive material, such as copper, and is arranged outside the protection case 16 as shown in FIG. 1 and FIG. 2. Each inter-group bus bar 26 has a substantially parallelogram shape such that a portion of the inter-group bus bar 26 shifts in the X direction as the portion of the inter-group bus bar 26 advances in the Z direction. That is, each inter-group bus bar 26 has a substantially parallelogram, shape such that the lower end of the inter-group bus bar 26 is connected to the corresponding conductive plate 24 of the negative electrode bus bar 25 of one of the battery groups 11 and the upper end of the inter-group bus bar 26 is connected to the corresponding conductive plate of the positive electrode bus bar 23 of the adjacent battery group 11 or the external output terminal.

Figure 6:
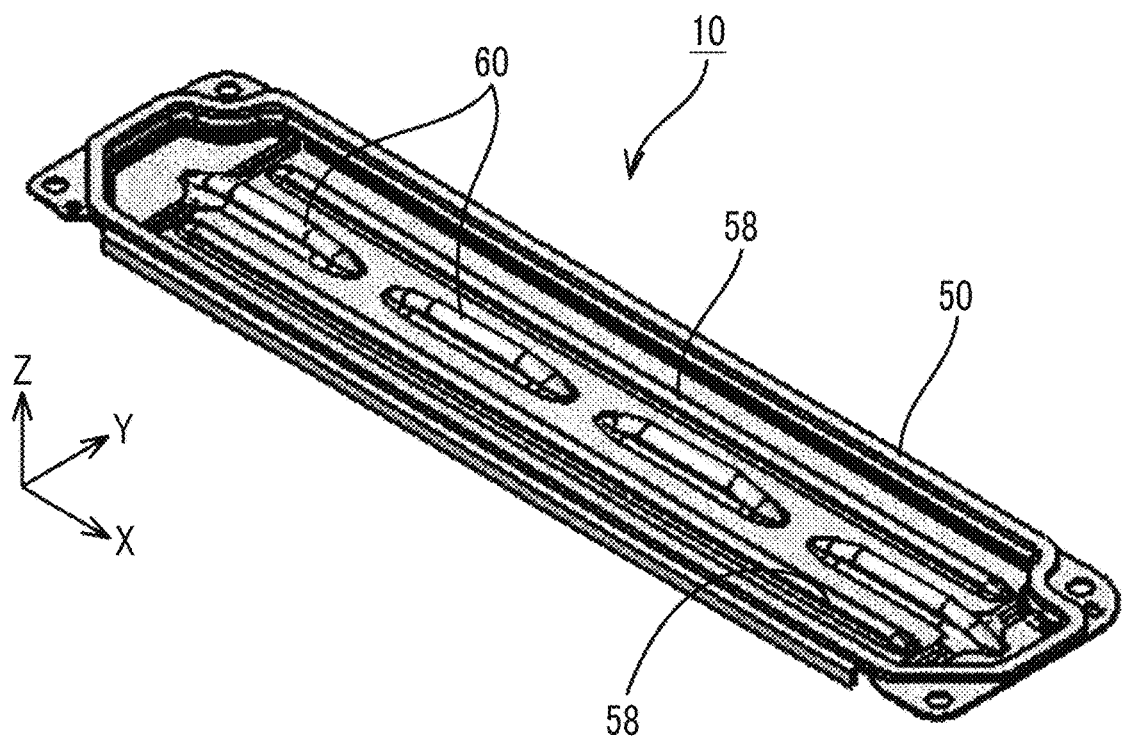
FIG. 6 is a perspective view of a smoke exhaust cover.

The smoke exhaust cover 20 is arranged below the battery holder 14 so as to face the negative electrode bus bar 25. FIG. 6 is a perspective view of the smoke exhaust cover 20. The smoke exhaust cover 20 is made of a metal, such as aluminum, and is molded by press working, or the like. Insulating treatment is applied to at least the surface of the smoke exhaust cover 20, facing the negative electrode bus bar 25. The mode of insulating treatment is not specifically limited, but, for example, a treatment method, such as cation application for applying an electrical insulation coating, may be employed.

The smoke exhaust cover 20 has a substantially boat form such that the vicinity of the peripheral edge extends upward. The seal face 50 is provided at the peripheral edge of the smoke exhaust cover 20. The seal face 50 closely contacts with the seal lip 46. Space defined between the smoke exhaust cover 20 and the negative electrode bus bar 25 (partition wall) is the exhaust chamber 28. Gas released from each single cell 12 to the exhaust chamber 28 is emitted to the outside of the battery module 10 via the exhaust holes 54 provided near both ends of the negative electrode bus bar 25 in the longitudinal direction and the exhaust passages 56 (see FIG. 1) provided in the battery holder 14, and is guided to an appropriate location by a duct, or the like.

Protective protrusions 58 and reinforcement protrusions 60 are provided at the bottom face of the smoke exhaust cover 20. The protective protrusions 58 and the reinforcement protrusions 60 are formed upright toward the negative electrode bus bar 25 The reinforcement protrusions 60 are provided at the center of the smoke exhaust cover 20 in the Y direction. The reinforcement protrusions 60 are provided in order to improve the stiffness of the smoke exhaust cover 20, and the plurality of (three in the illustrated example) reinforcement protrusions 60 are provided at spacings in the X direction. As shown in FIG. 2, the tipper ends of the reinforcement protrusions 60 do not need to be in contact with the negative electrode bus bar 25 or may be in contact with the negative electrode bus bar 25.

Figure 7:
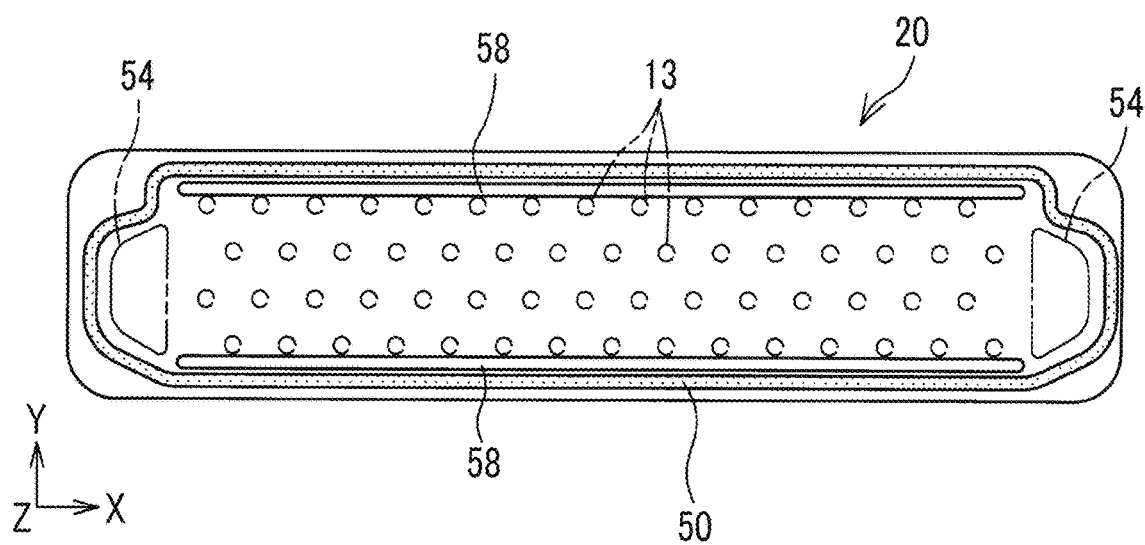
FIG. 7 is a view that shows the positional relation among protective protrusions, exhaust valves and exhaust holes.

The protective protrusions 58 are protrusions provided in order to block gas, released from the exhaust valves 13, from reaching the seal lip 46. FIG. 7 is a view that shows the positional relation among the protective protrusions 58, the exhaust valves 13 and the exhaust holes 54. In FIG. 7, illustration of the reinforcement protrusions 60 is omitted. As shown in FIG. 2, FIG. 6 and FIG. 7, the protective protrusions 58 are arranged near both ends of the smoke exhaust cover 20 in the Y direction, and extend continuously in the X direction. More specifically, the protective protrusions 58 are arranged between the seal lip 46 and the exhaust valves 13 adjacent to the seal lip 46 (in FIG. 7, the uppermost exhaust valves 13 and the lowermost exhaust valves 13) without intervening the exhaust, holes 54. In other words, the protective protrusions 58 are arranged between the seal lip 46 located at each end in the Y direction and the exhaust valves 13 located at the end in the Y direction. The length of each protective protrusion 58 in the X direction is substantially the same as the length of an array of the fifteen exhaust valves 13 arranged in the X direction. As shown in FIG. 2, the distal end of each protective protrusion 58 is in contact with the bottom face of the negative electrode bus bar 25, and blocks passage of gas released from the exhaust valves 13.

The protrusions 58, 60 are formed by pressing a flat sheet material. For this reason, the back sides of the protrusions 58, 60 are recesses dented toward the negative electrode bus bar 25. In this embodiment, a heater 70 for heating the single cells 12 is provided in each recess formed at the back side of each protective protrusion 58. That is, it is known that the performance of a lithium secondary battery or the like, decreases at low temperatures. Therefore, when the temperature of the single cells 12 is lower than or equal to a reference temperature, the heater 70 is driven to heat the single cells 12.

The heater 70 is not specifically limited as long as the heater 70 is allowed to be accommodated in the recess at the back side of each protective protrusion 58. As shown in FIG. 3, each heater 70 is formed such that a linear heating element 72, such as nichrome wire, is covered with an insulating element 74 (for example, glass fiber, or the like) and further covered with a heat-conducting element 76 made of a heat conductive material (such as aluminum). As described above, the battery module 10 is mounted on the heat-conductive frame 100 that is part of the pack case, and the bottom face of the smoke exhaust cover 20 is in contact with the heat-conductive feme 100. The heater 70 is accommodated in the recess at the back side of each protective protrusion 58, and is in contact with both the ceiling face of the recess and the heat-conductive frame 100.

As is apparent from the above description, the smoke exhaust cover 20 of the battery module 10 described in this specification includes the protective protrusions 58. The reason for providing the protective protrusions 58 will be described. As described above, gas released from the exhaust valve 13 of each single cell 12 is released to the exhaust chamber 28 defined by the negative electrode bus bar 25 and the smoke exhaust cover 20. The exhaust chamber 28 is sealed by the seal lip 46 in an airtight manner.

Gas released from each, single cell 12 has an extremely high temperature, and can reach several hundreds of degrees. When no protective protrusion 58 is provided, the high-temperature gas is allowed to easily reach the seal lip 46. The seal lip 46 is a resin member integrally molded with the resin 43 of the negative electrode bus bar 25. If the seal lip 46 contacts with high-temperature gas, the seal lip 46 easily degrades and breaks. If the seal lip 46 degrades and breaks and the seal performance deteriorates, part of gas in the exhaust chamber 28 is released to the outside.

In the battery module 10 described in this specification, each protective protrusion 58 is provided at the location between the seal lip 46 and the exhaust valves 13. As described above, each protective protrusion 58 is part of the smoke exhaust cover 20, and is made of a metal, such as aluminum. Therefore, even when the protective protrusion 58 contacts with high-temperature gas, the protective protrusion 58 is difficult to degrade. Since each protective protrusion 58 is in contact with the bottom face of the negative electrode bus bar 25, gas that reaches the seal lip 46 beyond the protective protrusions 58 is significantly reduced. By reducing gas that reaches the seal lip 46, degradation and damage of the seal lip 46 are effectively inhibited, so the airtightness of the exhaust chamber 28 is further effectively maintained.

Such an advantageous effect of inhibiting degradation of the seal lip 46 is sufficiently obtained if gas that reaches the seal lip 46 beyond the protective protrusions 58 is reduced to some extent. Therefore, the protective protrusions 58 and the negative electrode bus bar 25 do not need to completely shut off passage of gas, just need to be in proximity with each other to such a degree that passage of gas is blocked to some extent.

Incidentally, as shown in FIG. 6, each protective protrusion 58 linearly extends in the X direction. For this reason, each protective protrusion 58 restricts a flow of gas in the Y direction (flow to the seal lip 46 located at each end in the Y direction) but does not restrict a flow of gas its the X direction. In this embodiment, the exhaust holes 54 that guide gas, released to the exhaust chamber 28, to the outside are respectively provided at both ends in the X direction, and gas released from the exhaust valves 13 mainly travels in the X direction. In other words, in this embodiment, the direction in which each protective protrusion 58 extends is substantially parallel to the direction from the exhaust valves 13 to the exhaust holes 54. With the above configuration, even when the protective protrusions 58 are provided, a flow of gas toward the exhaust holes 54 is not blocked, and a pressure loss at the time of emission of gas is reduced.

When the protective protrusions 58 are provided, heat due to high-pressure gas is rapidly diffused. That is, in the step just before emission of gas, the temperature of each single cell 12 is high because of the influence of high-pressure gas. Desirably, heat that is generated due to such high-pressure gas is quickly diffused, and the temperature is equalized. In this embodiment, by bringing the distal end of each protective protrusion 58 into contact with the negative electrode bus bar 25, the heat of each single cell 12 is transferred to the smoke exhaust cover 20 and also to the heat-conductive frame that contacts with the smoke exhaust cover 20 via the battery holder 14 and the negative electrode bus bar 25. By providing the protective protrusions 58, the surface area of the smoke exhaust cover 20 increases, and the amount of heat absorbed also increases. As a result, heat due to high-pressure gas is further rapidly diffused, and the temperature is further rapidly equalized.

Figure 11:
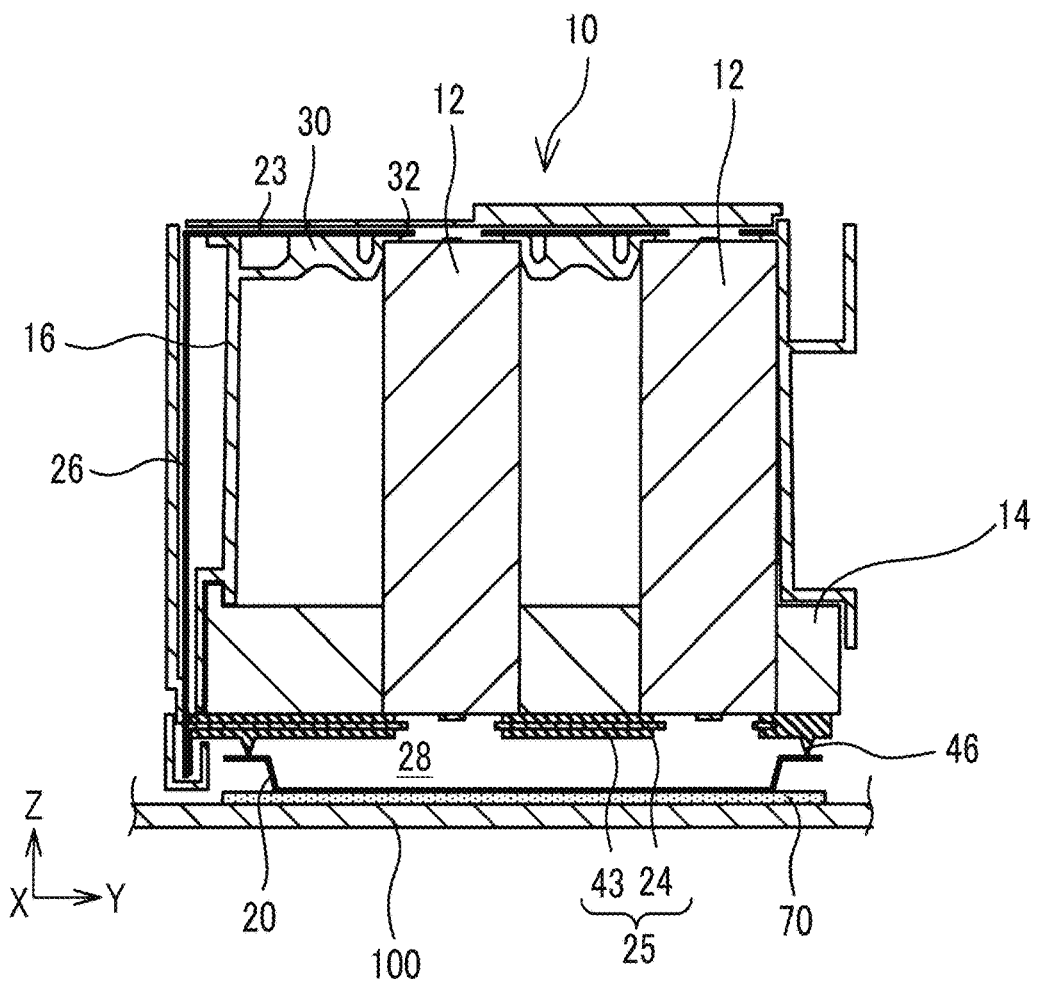
FIG. 11 is a view that shows an example of an existing battery module.

As described above, in this embodiment, the heater 70 is provided in the recess at the back side of each protective protrusion 58. By providing the heater 70 at the above location, the efficiency of the heater 70 is improved, and the build of the battery module 10 is reduced. That is, conventionally, the heater 70 for heating the single cells 12 is provided on the lower side of the smoke exhaust cover 20. However, as shown in FIG. 11, most of the existing heaters 70 are sheet heaters 70 each are interposed between the bottom face of the smoke exhaust cover 20 and the heat-conductive frame 100. For this reason, the heater 70 is located remote from the single cells 12 by the height of the exhaust chamber 28, and the heat of the heater 76 is difficult to be transferred to the single cells 12, so a thermal loss is large. By providing the sheet heater 70, the height of the battery module 10 increases by the thickness of the sheet heater 70. This leads to an increase in the size of the battery pack.

On the other hand, in this embodiment, the heater 70 is provided in the recess at the back side of each protective protrusion 58. For this reason, the distance between the heater 70 and the single cells 12 is shortened, so the thermal loss of the heater 70 is significantly reduced. Particularly, in this embodiment, the heater 70 is brought into contact with the smoke exhaust cover 20, and the smoke exhaust cover 20 is brought into contact with the negative electrode bus bar 25. In this case, since the heat of the heater 70 is transferred to the single cells 12 via the smoke exhaust cover 20 and the negative electrode bus bar 25, the heat of the heater 70 is further efficiently transferred to the single cells 12.

In this embodiment, the heat-conducting element 76 made of a heat conductive material is provided around the heating element 72, and the heat-conducting element 76 is brought into contact with both the smoke exhaust cover 20 and the heat-conductive frame 300. In the case of the above configuration, at the time of emission of gas, heat transferred to the smoke exhaust coyer 20 is further transferred to the heat-conductive frame 100 via the heat-conducting element 76 (heater 70). As a result, heat at the time of emission of gas is further rapidly diffused.

Figure 8:
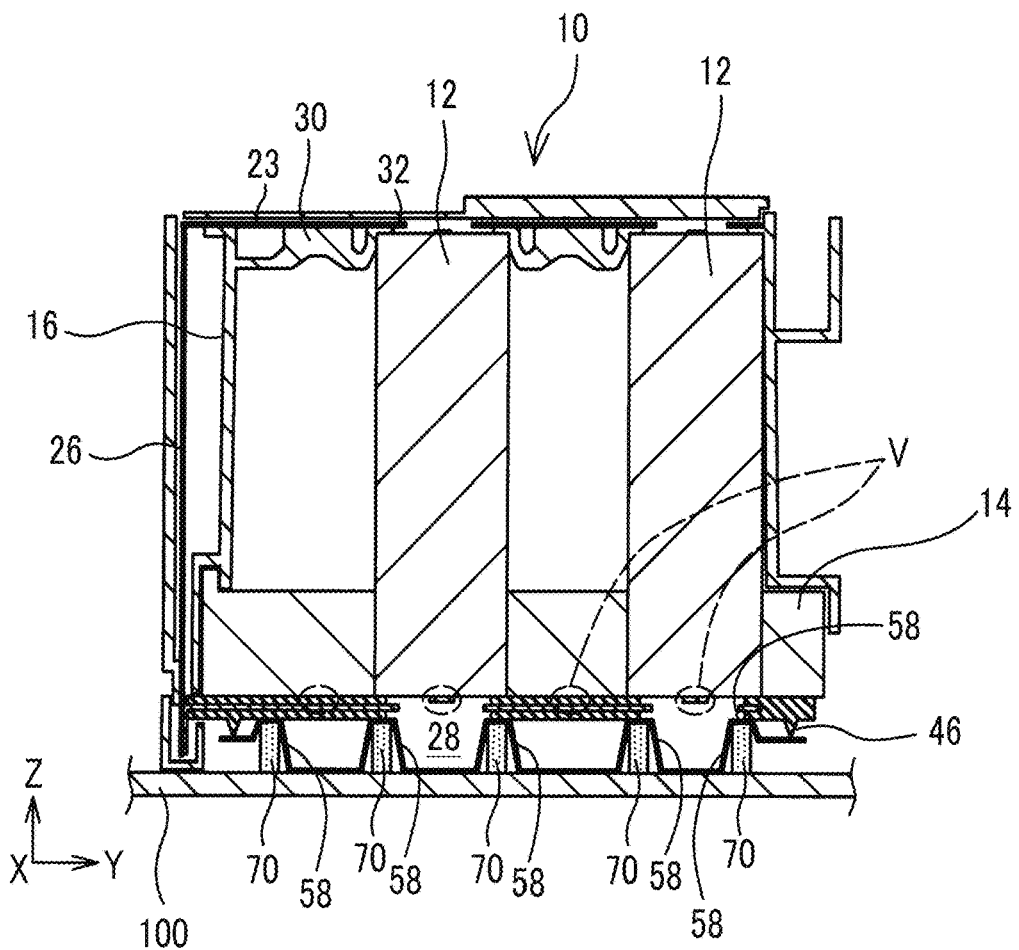
FIG. 8 is a cross-sectional view of another battery module.
Figure 9:
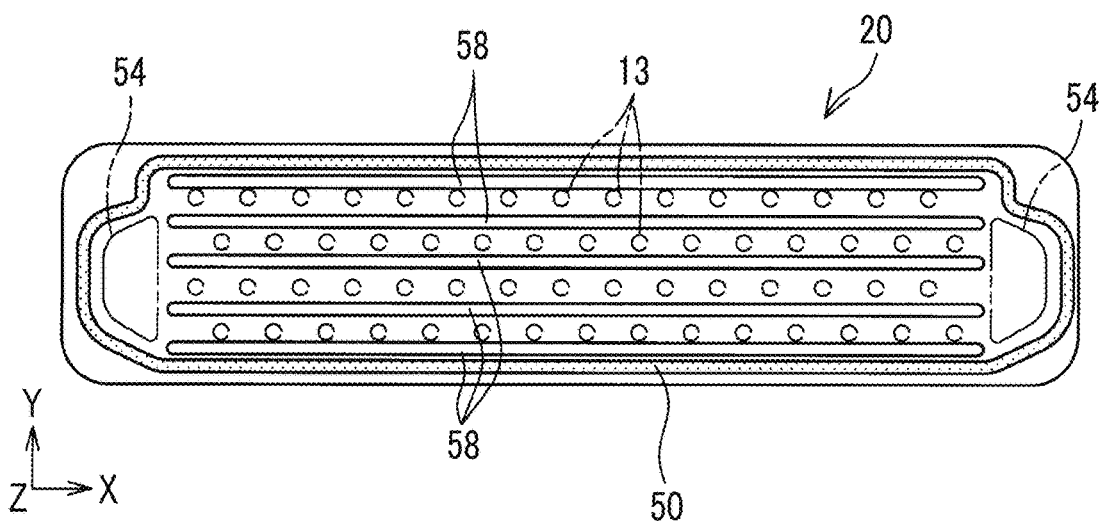
FIG. 9 is a view that shows the positional relation among protective protrusions, exhaust valves and exhaust holes in the battery module shown in FIG. 8.

The above-described configuration is one example. As long as the smoke exhaust cover 20 includes at least the protective protrusions 58 that are formed upright from the smoke exhaust cover 20 toward the negative electrode bus bar 25 (partition wall) at the location between the seal lip 46 and the exhaust valves 13 adjacent to the seal lip 46 without intervening the exhaust holes 54, the other configuration may be modified as needed. For example, in the above description, the protective protrusions 58 are provided only near both ends in the Y direction; however, a larger number of the protective protrusions 58 may be provided. For example, as shown in FIG. 8 and FIG. 9, the protective protrusions 58 that extend in the X direction may be provided not only near both ends in the Y direction but also at a location between any adjacent two of the exhaust valves 13 in the Y direction. In the illustrated example of FIG. 8 and FIG. 9, the single cells 12 are arranged in 4 rows in the X direction, and the protective protrusions 58 are provided one by one, five in total, between the rows of the single cells 12 and between the row of the single cells 12 and the seal lip 46. In this way, by providing the plurality of protective protrusions 58, gas released from the single cells 12 is further effectively inhibited from reaching the seal lip 46, and, by extension, degradation of the seal lip 46 is further effectively inhibited.

Figure 10:
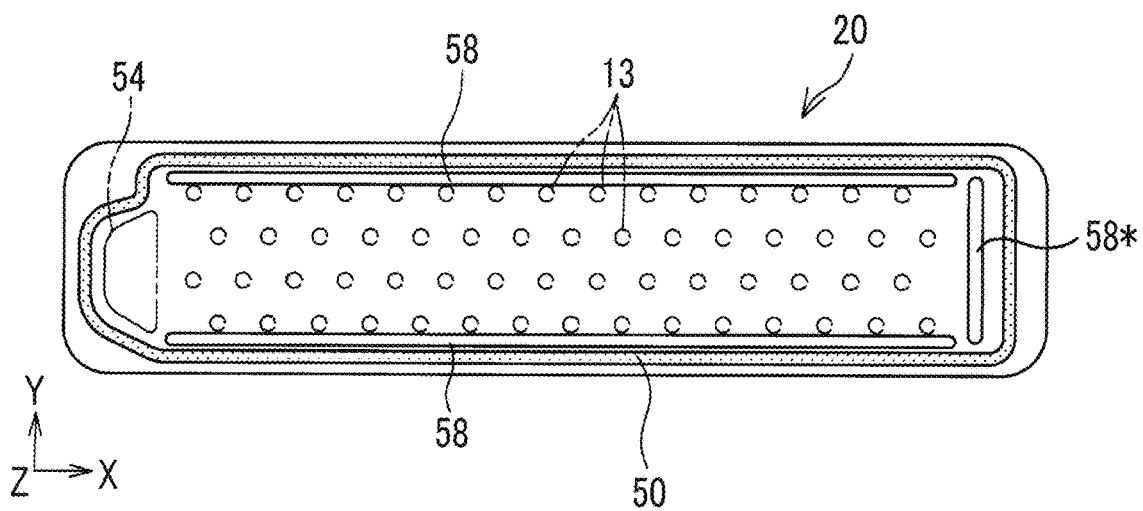
FIG. 10 is a view that shows the positional relation among protective protrusions, exhaust valves and an exhaust hole in another battery module.

In above description, the exhaust holes 54 that communicate the exhaust chamber 28 with the outside are provided at both ends in the X direction. Instead, as shown in FIG. 10, the exhaust hole 54 may be provided only at one end in the X direction, and the exhaust hole 54 at the other end in the X direction may be omitted. In this case, the exhaust valves 13 at the other end in the X direction are adjacent to the seal lip 46 without intervening the exhaust hole 54. In such a case, a protective protrusion 58* just needs to be provided at a location between the exhaust valves 13 at the other end in the X direction and the seal lip 46 at the other end side in the X direction.

In the above description, the heater 70 is arranged in the recess at the back side of each protective protrusion 38. Instead, the heater 70 may be omitted or may be arranged at another location. Bach of the single cells 12 to be incorporated in the battery module 10 is not limited to a circular columnar type as long as each single cell 12 has the exhaust valve 13 that releases gas. Each of the single cells 12 may have another shape, such as a square columnar shape or a substantially rectangular parallelepiped shape. In the above description, the negative electrode bus bar 25 that electrically connects the plurality of single cells 12 with one another functions as a partition wall that isolates the battery chamber and the exhaust chamber 28 from each other. Instead, the partition wall may be formed of another member. In the above description, the seal lip 46 integrated with the negative electrode bus bar 25 is used as the seal member. Another member may be used instead of the seal lip 46 as long as another member is interposed between the smoke exhaust cover 20 and the partition wall (negative electrode bus bar 25) and seals the exhaust chamber 28 in an airtight manner. Instead of the seal lip 46, the exhaust chamber 28 may be sealed with the use of for example, an O-ring that is separated from the negative electrode bus bar 25.

What is claimed is:

1. A battery pack comprising:
one or more battery modules each including
a plurality of single cells each including an exhaust valve configured to release gas,
a battery chamber accommodating the plurality of single cells,
an exhaust chamber provided adjacently to the battery chamber, the exhaust chamber having one or more exhaust holes configured to flow through gas released from the single cells and configured to release the gas to an outside,
a partition wall isolating the exhaust chamber and the battery chamber from each other in a state where the exhaust valves of the plurality of single cells are exposed to the exhaust chamber, the partition wall includes a conductive plate,
a smoke exhaust cover arranged so as to face the partition wall, and
a seal member interposed between a peripheral edge of the smoke exhaust cover and a peripheral edge of the partition wall, a cross sectional of the seal member is substantially triangular in shape that tapers toward a distal end, the seal member is in contact with the conductive plate of the partition wall, the seal member sealing the smoke exhaust cover and the partition wall in an airtight manner,
the exhaust chamber being defined by the partition wall, the smoke exhaust cover and the seal member, and
the smoke exhaust cover including a protrusion that is configured upright from the smoke exhaust cover toward the partition wall at least at a location between the seal member and the exhaust valves adjacent to the seal member without intervening the exhaust hole in order to block gas, released from the exhaust valves of the plurality of single cells, from reaching the seal member.

2. The battery pack according to claim 1, wherein
the one or more exhaust holes is a plurality of exhaust holes, wherein at least one exhaust hole of the plurality of exhaust holes is provided near each of both ends of the exhaust chamber in a first direction, and
the smoke exhaust cover includes the protrusion at least at a location between the seal member located at each end in a second direction perpendicular to the first direction and the exhaust valves located at each end in the second direction, the protrusion is configured upright from the smoke exhaust cover toward the partition wall and extends in the first direction.

3. The battery pack according to claim 2, wherein
the smoke exhaust cover further includes the protrusion at a location between two exhaust valves adjacent in the second direction, and the protrusion is configured upright from the smoke exhaust cover toward the partition wall and extends in the first direction.

4. The battery pack according to claim 1, wherein
the protrusion contacts with the partition wall.

5. The battery pack according to claim 1, wherein
a back side of the protrusion is a recess, and
each of the one or more battery modules further includes a heater accommodated in the recess and configured to heat the single cells.

6. The battery pack according to claim 5, further comprising:
a heat-conductive frame including a heat conductive metal, each battery module of the one or more battery modules being mounted on the heat-conductive frame, wherein the heater includes a heating element and a heat-conducting element that covers the heating element, and the heat-conducting element contacts with the smoke exhaust cover and the heat-conductive frame.

7. The battery pack according to claim 1, wherein the conductive plate of the partition wall is at least partially positioned within a resin member.

8. A battery module comprising:

a plurality of single cells each including an exhaust valve configured to release gas;

a battery chamber accommodating the plurality of single cells;

an exhaust chamber provided adjacently to the battery chamber, the exhaust chamber having one or more exhaust holes configured to flow through gas released from the single cells and configured to release the gas to an outside;

a partition wall isolating the exhaust chamber and the battery chamber from each other in a state where the exhaust valves of the plurality of single cells are exposed to the exhaust chamber, the partition wall includes a conductive plate;

a smoke exhaust cover arranged so as to face the partition wall; and a seal member interposed between a peripheral edge of the smoke exhaust cover and a peripheral edge of the partition wall, a cross sectional of the seal member is substantially triangular in shape that tapers toward a distal end, the seal member is in contact with the conductive plate of the partition wall, the seal member sealing the smoke exhaust cover and the partition wall in an airtight manner, the exhaust chamber being defined by the partition wall, the smoke exhaust cover and the seal member, and the smoke exhaust cover including a protrusion that is configured upright from the smoke exhaust cover toward the partition wall at least at a location between the seal member and the exhaust valves adjacent to the seal member without intervening the exhaust hole in order to block gas, released from the exhaust valves of the plurality of single cells, from reaching the seal member.

9. The battery module according to claim 8, wherein the one or more exhaust holes is a plurality of exhaust holes, wherein at least one exhaust hole of the plurality of exhaust holes is provided near each of both ends of the exhaust chamber in a first direction, and the smoke exhaust cover includes the protrusion at least at a location between the seal member located at each end in a second direction perpendicular to the first direction and the exhaust valves located at each end in the second direction, the protrusion is configured upright from the smoke exhaust cover toward the partition wall and extends in the first direction.

10. The battery module according to claim 9, wherein the smoke exhaust cover further includes the protrusion at a location between two exhaust valves adjacent in the second direction, and the protrusion is configured upright from the smoke exhaust cover toward the partition wall and extends in the first direction.

11. The battery module according to claim 8, wherein the protrusion contacts with the partition wall.

12. The battery module according to claim 8, further comprising:

a heater, wherein:

a back side of the protrusion is a recess, and the heater is accommodated in the recess and configured to heat the single cells.

13. The battery module according to claim 12, wherein the battery module is mounted on a heat-conductive frame including a heat conductive metal, and wherein:

the heater includes a heating element and a heat-conducting element that covers the heating element, and the heat-conducting element contacts with the smoke exhaust cover and the heat-conductive frame.

14. The battery module according to claim 8, wherein the conductive plate of the partition wall is at least partially positioned within a resin member.

* * * * *